(12) United States Patent
Bardi

(10) Patent No.: US 10,631,453 B2
(45) Date of Patent: Apr. 28, 2020

(54) LOW PROFILE SEED TREATER WITH METERING FUNCTIONALITY

(75) Inventor: Danick J. Bardi, Delisle (CA)

(73) Assignee: Bayer Cropscience Inc., Calgary (CA)

( * ) Notice: Subject to any disclaimer, the term of this patent is extended or adjusted under 35 U.S.C. 154(b) by 787 days.

(21) Appl. No.: 14/413,331

(22) PCT Filed: Jul. 9, 2012

(86) PCT No.: PCT/CA2012/000641
§ 371 (c)(1),
(2), (4) Date: Aug. 24, 2015

(87) PCT Pub. No.: WO2014/008571
PCT Pub. Date: Jan. 16, 2014

(65) Prior Publication Data
US 2015/0359164 A1    Dec. 17, 2015

(51) Int. Cl.
*A01C 1/06* (2006.01)
*A01C 1/00* (2006.01)
*B65G 15/44* (2006.01)
*B65G 15/42* (2006.01)
*A01C 15/00* (2006.01)

(52) U.S. Cl.
CPC ............... *A01C 1/06* (2013.01); *A01C 1/00* (2013.01); *B65G 15/44* (2013.01); *A01C 15/003* (2013.01); *B65G 15/42* (2013.01)

(58) Field of Classification Search
CPC .... A01C 1/06; A01C 1/00; A01C 3/04; A01C 3/06; A01C 3/063; A01C 7/06; A01C 7/16; A01C 9/02; A01G 1/044
See application file for complete search history.

(56) References Cited

U.S. PATENT DOCUMENTS

| 3,765,125 | A | * | 10/1973 | Amburn | A01C 1/00 47/1.3 |
| 4,023,525 | A | | 5/1977 | Weber | |
| 4,208,135 | A | * | 6/1980 | Bastiao | A01C 1/00 366/219 |
| 4,993,316 | A | * | 2/1991 | Greer | A01C 1/02 99/487 |
| 6,698,137 | B2 | | 3/2004 | Muhr | |
| 2009/0231110 | A1 | * | 9/2009 | Hyde | A01G 7/00 340/10.41 |

(Continued)

FOREIGN PATENT DOCUMENTS

| CA | 2196001 A1 | 7/1998 |
| CA | 2704589 | 5/2009 |

(Continued)

*Primary Examiner* — Jessica B Wong
(74) *Attorney, Agent, or Firm* — Patterson Thuente Pedersen, P.A.

(57) ABSTRACT

An apparatus and method for metering and treating seed. The apparatus incorporates a belt conveyor or circular conveyor within a housing enabling a low-profile configuration, the conveyor having a plurality of cleats forming a series of separate voids for transporting determinable volumes of seed, and a seed treatment applicator adjacent the conveyor outlet for applying seed treatment to the seed. The apparatus and method enables the application of seed treatment based on a mass flow calculation derived from the measured volume flow through the apparatus.

11 Claims, 13 Drawing Sheets

(56) References Cited

U.S. PATENT DOCUMENTS

2011/0027479 A1   2/2011   Reineccius et al.

FOREIGN PATENT DOCUMENTS

| CA | 2704589 A1 | 5/2009 | | |
|---|---|---|---|---|
| EP | 1 285 562 A1 | 2/2003 | | |
| FR | 2 593 663 A1 | 8/1987 | | |
| GB | 649436 A | * | 1/1951 | ............... A01C 7/16 |
| GB | 1 568 514 | 5/1980 | | |
| GB | 2 351 488 A | 1/2001 | | |
| WO | WO 2011/017252 A1 | 2/2011 | | |

* cited by examiner

Main Screen

Prime / Empty Screen

Main Recipe Screen

| Recipe Name: | WHEAT: RAXIL MD |
|---|---|
| Seed Density: | 64.2 lb/Bushel |
| Application Rate: | 300 mL/100KG |
| Pump Calibration Number: | 1000 | Pump Test |
| Escape | | Save and Continue |

Recipe Setting Screen

FIG. 7d

Pump Calibration Screen

| | |
|---|---|
| Recipe Selected: | WHEAT: RAXIL MD |
| Batch Size:<br>< 0 for Cont. > | 0 lbs |
| lbs Treated | 0 lbs |
| mL/Min | 900 |
| Bushels/Min | 10.30 |
| lbs/Min | 661 |
| Conveyor RPM | 0 |
| Pump RPM | 0 |

Rate Adjust

Start

Return to Main Menu

Operation Screen

FIG. 7f

| | | |
|---|---|---|
| lbs Treated This Batch | 0 | |
| Batch A Total Treated (lbs) | 73565 | RESET |
| Treatment Used (L) | 104 | |
| Batch B Total Treated (lbs) | 73565 | RESET |
| Treatment Used (L) | 104 | |
| LifeTime Total Treated (lbs) | | |
| 702892 | Return to Main Menu | |

Totals Screen

FIG. 7g

LOW PROFILE SEED TREATER WITH METERING FUNCTIONALITY

RELATED APPLICATIONS

This application is a National Phase entry of PCT Application No. PCT/CA2012/000641, filed Jul. 9, 2012, said application being hereby incorporated by reference in its entirety.

FIELD OF THE INVENTION

The present invention relates to seed treatment apparatuses and methods, and more particularly to seed treatment apparatuses and methods that incorporate seed metering.

BACKGROUND OF THE INVENTION

It is well known in the agricultural arts to apply various treatments to seeds before planting, in an effort to reduce the amount of such treatment that would otherwise be required were it to be applied to a field after planting. For example, treatments may include the application of fertilizers, insecticides, pesticides and fungicides, and normally take the form of liquid chemical that is sprayed onto the seed. While seed treatment apparatuses are commercially available, it is more common to see a farmer spray treatment directly onto seed just before it is drawn up an auger, the auger being employed to mix the treated seed in an effort to spread the treatment coating over as much seed surface as possible before planting. Such manual application, however, normally results in overuse of expensive treatment (due to a failure to properly meter the seed and control the treatment amount) and loss of treatment (particularly due to wind) and may even have health implications depending on the nature and toxicity of the particular treatment being applied, although manual application may also result in too little treatment being applied and therefore a reduction in the desired effect.

Various seed treatment apparatuses have been disclosed in the prior art, some of which have been made commercially available. For example, Canadian Patent No. 518,715 to Calkins provides an early example of a seed treatment device that incorporates metering of seed, where a "dump pan" is employed, but the metering approach is unfortunately inaccurate and the focus of the teaching is on slurry agitation rather than achieving optimal treatment application. Canadian Patent Application No. 2,704,589 to Hunter et al. teaches a more accurate metering system, where seed weight is determined using a load cell to calculate an optimal treatment application, but the apparatus is designed for batch processing in a research setting rather than the high-throughput seed treatment required in a commercial farming operation.

One of the commercially available seed treaters for on-farm use is described in Canadian Patent No. 2,196,001 to Graham. The Graham apparatus, or "G3", is used with two augers, where one auger transports seed upwardly (from an auger hopper positioned under a hopper-bottom bin or similar) toward the upper intake of the seed treater, and the seed is then sprayed with treatment as it falls downwardly through the seed treater, with the second auger serving to mix the treated seed and transport it upwardly to a truck or storage unit. The seed falls in an annular pattern adjacent the inner surface of the treater, and a centrally-disposed nozzle sprays treatment in a conical spray pattern in an effort to contact as much seed as possible. While this apparatus may provide an improvement over manual application methods, it has been found that treatment builds up around the inner surface of the treater and is therefore wasted. However, a more significant issue has been noted with this and other auger-based treaters, namely, that using an auger to determine volume flow through the system (and hence the amount of treatment to apply) can be quite inaccurate due to product slippage inherent in the screw-type transport mechanism. Also, optimal treatment application rates are provided in mL/100 kg, so a reliance on volume alone without an adjustment for seed density can contribute to an application rate that is not optimized, hence resulting in treatment waste. In a commercial farming operation, the cost of such waste can be substantial.

The problem of treatment waste and optimized application rates in a commercial farming context has not been canvassed to a significant extent in the prior art. One example is U.S. patent application Ser. No. 12/848,412 to Reineccius et al., which teaches an apparatus that provides an accurate means for measuring seed volume to determine an optimal treatment application rate. However, the apparatus itself is of a physical scale that may limit its on-farm application and, while providing a volume determination mechanism superior to that of Graham and other auger-type apparatuses, the teaching does not take seed density into account.

What is needed, therefore, is an apparatus and method that can be applied in commercial farming operations for metering seed to determine a more optimized treatment application rate.

SUMMARY OF THE INVENTION

The present invention accordingly seeks to provide a seed treatment apparatus and method that meters seed based on volume and uses mass flow based on seed density to calculate optimal treatment application rate for a given seed type, in an apparatus configuration capable of use with on-farm storage units.

According to a first aspect of the present invention there is provided a seed treatment apparatus comprising:
  a housing having an inner surface;
  a conveyor generally horizontally disposed within the housing, the conveyor having spaced apart first and second ends and a conveyor drive mechanism;
  a conveyor intake adjacent the first end for receiving seed;
  a conveyor outlet adjacent the second end for discharging the seed;
  a plurality of cleats each having opposed first and second edges, the cleats mounted at their first edges on an outward surface of the conveyor at regular spaced apart intervals, the second edges of the cleats extending toward the inner surface of the housing, such that the outward surface and the inner surface and the cleats collectively define a series of voids for receiving and transporting determinable volumes of the seed;
  a seed treatment applicator adjacent the conveyor outlet for receiving the discharged seed and applying seed treatment to the seed; and
  a seed treatment source in fluid communication with the seed treatment applicator for providing the seed treatment.

In some embodiments of the present invention, the housing may comprise the conveyor intake and the conveyor outlet, and the housing may also contain the seed treatment applicator and comprise a treated seed outlet. A scraper may be incorporated extending downwardly from the inner surface of the housing, the scraper (which may be a brush) having a length generally equal to a distance between the inner surface of the housing and the second edges of the cleats and a width generally equal to the cleats, such that when the cleats pass by the scraper the scraper levels off the received seed so that the received seed is generally flush with the second edges of the cleats. The conveyor may be a continuous belt conveyor or a circular conveyor, and the seed treatment applicator may comprise a peristaltic pump and spray nozzles. In some embodiments, the apparatus may further comprise a controller for controlling the conveyor drive mechanism and the seed treatment applicator, and the controller comprises a programmable logic controller, a data storage, a user interface, and a display (the user interface and the display may collectively be a touchscreen monitor). Certain embodiments may further comprise a channeling collar mounted on the conveyor intake for directing the seed toward the conveyor intake, and the channeling collar may also be upwardly biased so as to sealingly engage with a source of the seed. The housing may also be provided with an extensible support for selectively elevating the second end of the conveyor, thereby providing an enhanced area for treatment application, and further comprising at least one ground-engaging wheel to enable relocation of the apparatus.

According to a second aspect of the present invention there is provided a method for treating seed comprising the steps of:
a. determining a seed density value for the seed;
b. metering the seed to determine a seed volume;
c. using the seed density value to convert the seed volume to a seed mass;
d. calculating an optimal seed treatment application rate based on the seed mass; and
e. applying seed treatment to the metered seed based on the optimal seed treatment application rate.

According to a third aspect of the present invention there is provided a method for treating seed using a metering apparatus, the method comprising the steps of:
a. determining a seed density value for the seed;
b. using the metering apparatus to determine a seed volume flow through the apparatus;
c. using the seed density value to convert the seed volume flow to a seed mass flow through the apparatus;
d. calculating an optimal seed treatment application rate based on the seed mass flow; and
e. applying seed treatment to the metered seed based on the optimal seed treatment application rate.

In some methods according to the present invention, the apparatus may comprise a metering conveyor and the seed volume flow is determined on the basis of the volume of the seed conveyed by the metering conveyor. The apparatus may also comprises a programmable logic controller that is programmed to convert the seed volume flow to the seed mass flow using the determined seed density value, and the programmable logic controller is programmed to calculate the optimal seed treatment application rate based on the seed mass flow. Finally, the apparatus may comprise a seed treatment applicator for applying the seed treatment to the metered seed.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention:

FIGS. 7a to 7g are screen shots of the user interface and display of the controller;
FIG. 12b is a top plan view of the alternative conveyor embodiment of FIG. 12a.

Figure 1:
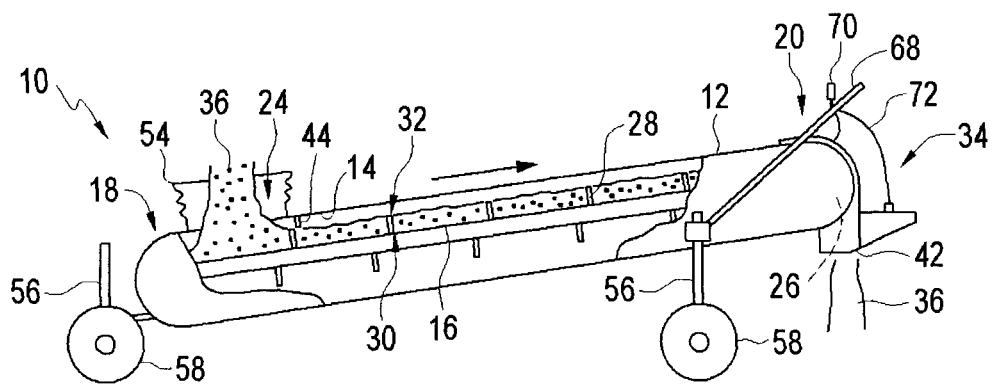
FIG. 1 is a side elevation view of an apparatus according to the present invention, with a cut-away portion showing the conveyor.

Exemplary embodiments of the present invention will now be described with reference to the accompanying drawings.

DETAILED DESCRIPTION OF EXEMPLARY EMBODIMENTS

Referring now to the accompanying drawings, embodiments of an apparatus and method according to the present invention are illustrated. It is to be understood that the illustrated embodiments are exemplary only and other embodiments may properly fall within the scope of the claims.

Referring now in detail to FIGS. 1 through 4, an apparatus 10 according to the present invention is illustrated. The apparatus 10 comprises a conveyor 16 within a housing 12, the conveyor 16 positioned generally horizontally to provide a low profile to enable positioning of the apparatus 10 underneath a hopper-bottom bin or similar seed storage unit, the conveyor configured to move seed 36 on the top of the conveyor 16 in the direction of the arrow in FIG. 1. The housing 12 comprises a seed intake 24 at a first end 18 of the conveyor 16 and a seed outlet 26 at a second end 20 of the conveyor 16. While various drive mechanisms are possible within the scope of the present invention, a conventional motor 22 is shown in the illustrated embodiment as being mounted on a side of the housing 12 for providing power to the conveyor 16, the motor being connected to a power source 74 and a controller 50 in a manner determinable by those skilled in the art.

The conveyor 16, which is a continuous belt in the embodiment shown in FIGS. 1 through 5, is provided with a series of spaced apart cleats 28, the cleats mounted on the conveyor 16 at a first edge 30, the second edge 32 of each cleat 28 directed toward an inner surface 14 of the housing 12. The cleats 28 are equally spaced along the conveyor 16 and rigidly mounted perpendicular to the conveyor surface to avoid forward or rearward bending when retaining and transporting seed 36; it will be obvious to those skilled in the art, however, that the cleats 28 could be mounted in such a way that they are disposed off of the vertical and still achieve the desired functionality. In the result, the conveyor 16, two adjacent cleats 28 and surrounding housing 12 walls define a generally cuboid receiving void for receipt and transport of seed 36 to be treated, and the series of equally spaced cleats 28 therefore provide a continuous series of such voids of equal volume. The consistency of volumes in series allows calculation of an appropriate amount of treatment 38 application. The cleats 28 are also preferably composed of a flexible material to avoid crushing of seed 36 that might get caught against the housing 12 inner walls during movement of the conveyor 16.

Figure 12A:
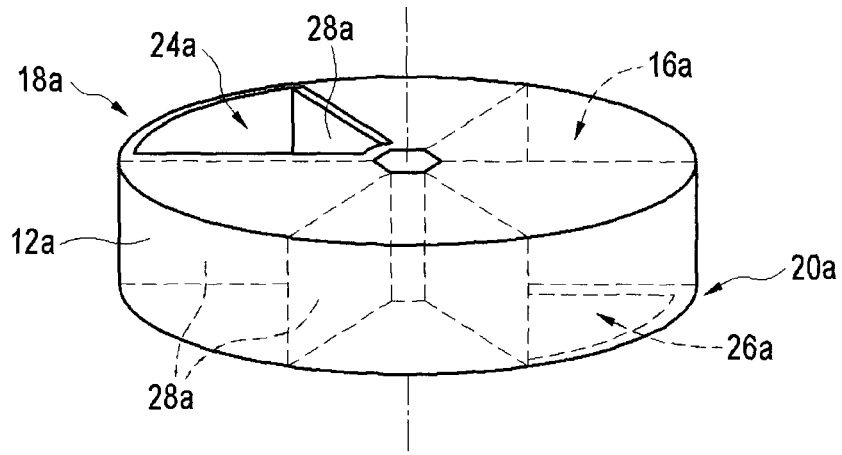
FIG. 12a is a side perspective view of an alternative conveyor embodiment.
Figure 12B:
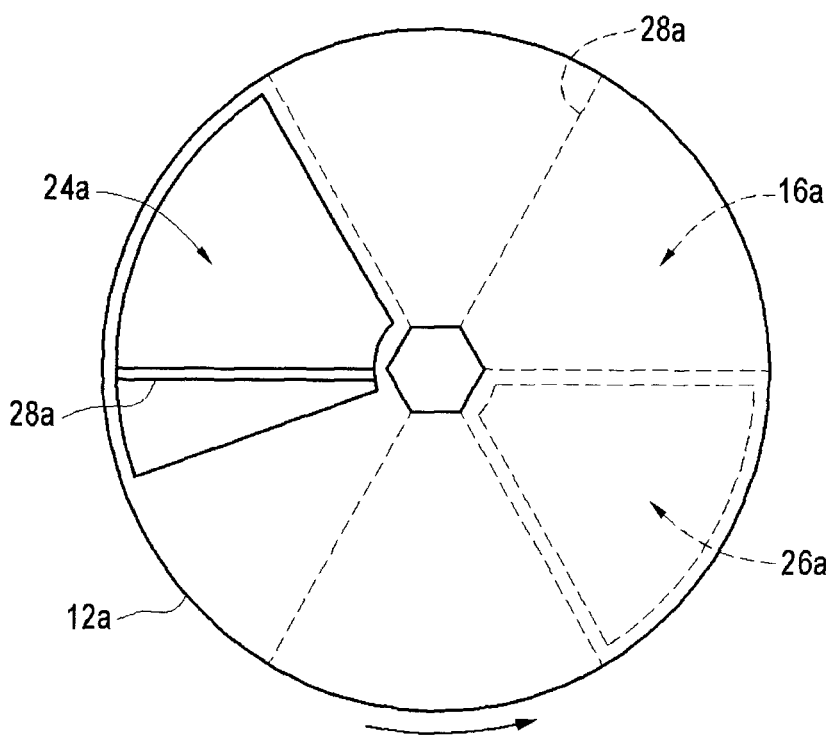

FIGS. 12a and 12b illustrate an alternative conveyor 16a, which is in the form of a horizontally disposed wheel that rotates about a vertical axis. Rather than the continuous belt configuration of FIGS. 1 through 5 with cuboid voids, this alternative embodiment illustrates a further configuration that embodies the present invention where the voids are generally triangular. The conveyor 16a is housed within a circular housing 12a and rotates about its vertical axis in the direction shown by the arrow in FIG. 12b, the voids defined in part by cleats 28a. The intake 24a is located at a first end 18a of the conveyor 16a and comprises an aperture in the upper surface of the housing 12a, which aperture opens into a triangular void. Seed can be deposited into the triangular void through the intake 24a. As can be seen in FIG. 12b, the intake 24a may be larger than the width of an individual void, which has been found to be helpful in ensuring a complete filling of the void at certain higher operating speeds. Once an individual void is filled, it is rotated out of alignment with the intake 24a (through the action of a drive mechanism, which could for example be situated beside or under the housing 12a) and towards the outlet 26a, which comprises an aperture located at a second end 20a of the conveyor 16a in the lower surface of the housing 12a; once the void is positioned over the outlet 26a the seed is allowed to fall downwardly out of the void through the outlet 26a. In this way, the alternative conveyor 16a functions in a similar manner to the conveyor 16 of FIGS. 1 through 5, although empty voids return to the intake 24a on the same horizontal plane as the filled voids rather than passing rearwardly on the underside of the belt-like conveyor 16. The conveyor 16a and housing 12a could also be provided with a channeling collar as is illustrated in FIG. 1, to channel seed toward the intake 24a, or the housing 12a could be raised into position against a bin outlet by means known in the art. Other alternative conveyor configurations will be obvious to one skilled in the art.

Figure 3:
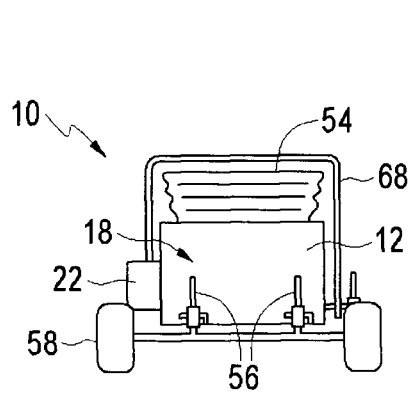
FIG. 3 is a rear elevation view of the apparatus of FIG. 1.
Figure 4:
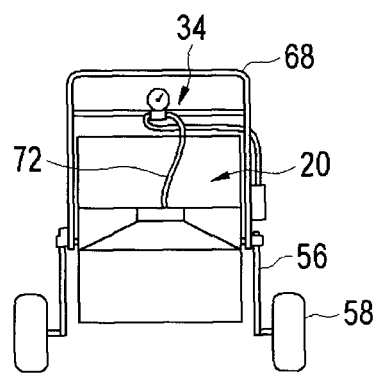
FIG. 4 is a front elevation view of the apparatus of FIG. 1.

As can best be seen in FIGS. 1 and 3, the housing 12 comprises a channeling collar 54 mounted on the intake 24. The collar 54 is composed of a flexible material that folds in an accordion-like fashion. The collar 54 may be positionable in any degree of upward extension, or it may be biased upwardly into an extended position by means known to those skilled in the art such as external or internally integrated springs. The purpose of the collar 54 is to channel seed 36 from an overlying storage unit toward the intake 24, which collar 54 may be spaced from the storage unit outlet or sealingly engaged with it. This feature allows the user to avoid seed loss due to misalignment of the storage unit outlet and the intake 24 and also due to wind. The collar 54 also functions to allow flooding of the conveyor 16 with seed 36 to ensure accuracy of volume flow determination.

The apparatus 10 is also provided with a handle 68 and wheels 58 to enable a user to move the apparatus 10 into position beneath a seed storage unit. The wheels 58 can be caster wheels, and they are mounted on extensible legs 56 in the illustrated embodiment, as can best be seen in FIGS. 1, 3 and 4. The extensible legs 56 allow the user to vertically adjust the rear of the apparatus 10 to better position the intake 24 for receipt of seed 36, but also to raise the front of the apparatus 10 slightly to enhance the area for spraying treatment 38 on the metered seed 36.

Figure 2:
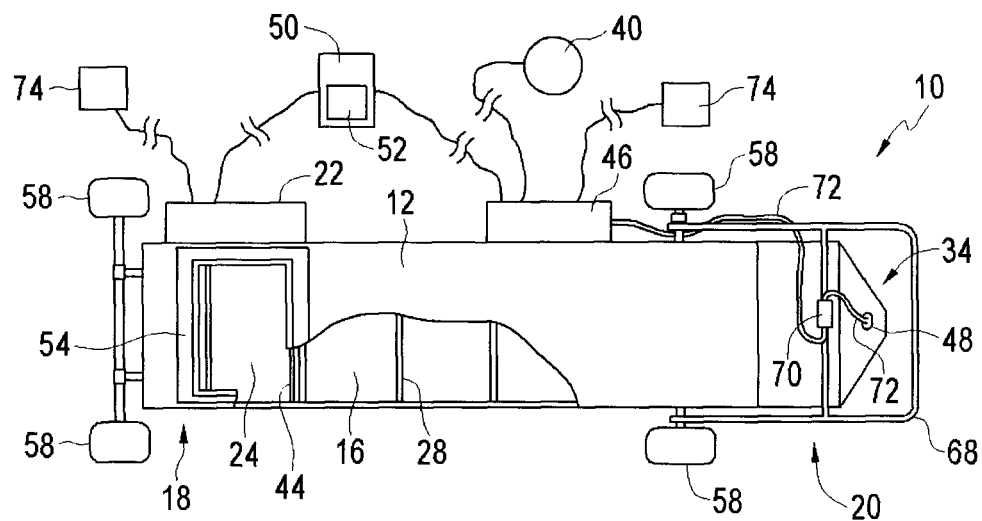
FIG. 2 is a top plan view of the apparatus of FIG. 1 with a cut-away portion showing the conveyor.
Figure 5:
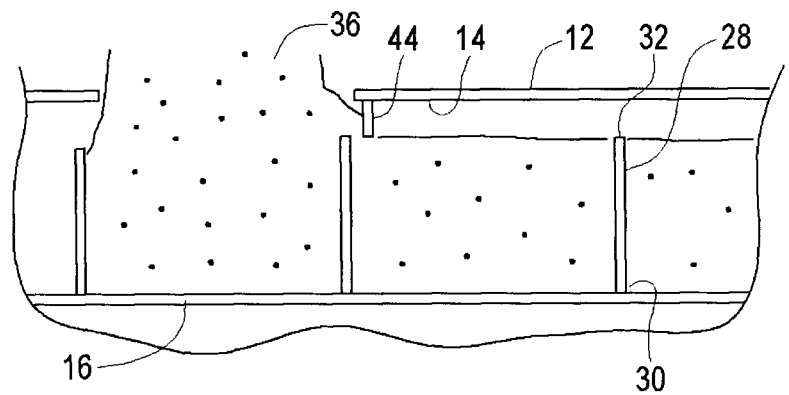
FIG. 5 is a detail illustration of the brush-cleat interface.

FIGS. 1 and 2 show the position of a scraper or brush 44 which is mounted on the inner surface 14 of the housing 12 adjacent the intake 24. The brush 44 is an elongate member that extends across the width of the housing 12 and is generally equivalent in length to a cleat 28. The brush 44 functions to help level off the seed 36 that has been received in each cuboid void, helping to ensure consistent seed 36 volumes in each void. FIG. 5 provides a detailed illustration of the interface between the brush 44 and a cleat 28. While the void could be initially filled above the second edge 32 of the cleat 28, the conveyor 16 moves the cleats 28 and received seed 36 past the brush 44, thereby scraping off the excess seed 36 such that it remains in the intake 24 area. It will also be obvious to those skilled in the art that the edge of the intake 24 could serve the same function as the brush 44 in modified or unmodified form in alternative embodiments of the present invention.

Figure 6:
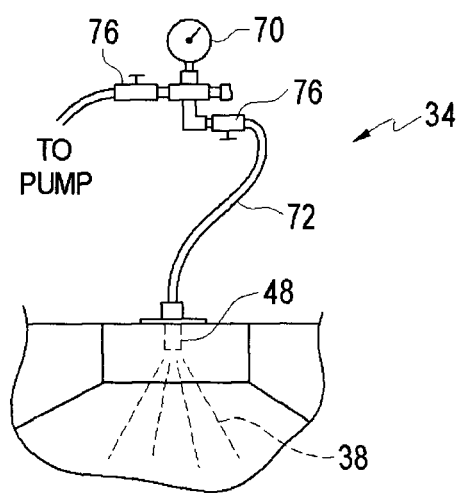
FIG. 6 is a detail illustration of the applicator.

The above description is addressed to the metering functionality of the apparatus 10, whereby determinable volumes of seed 36 in each cuboid void result in a determinable volume flow through the apparatus 10. The apparatus 10 is also provided with seed treating functionality, where the metered seed 36 is provided with treatment 38. The seed treatment applicator 34 is positioned at the front end of the apparatus 10 over the conveyor outlet 26 and comprises a housing for directing metered seed 36 downwardly past a spray nozzle 48. A pump 46 (such as a peristaltic pump) is mounted on a side of the housing 12 for drawing treatment 38 from a treatment source 40 such as a barrel, and the pump is connected to both a power source 74 and the controller 50. The pump 46 is configured to draw treatment 38 from the treatment source 40 and direct the treatment 38 through treatment lines 72 toward the nozzle 48. As can be seen in the detailed illustration of FIG. 6, the treatment line 72 can be connected to valves 76 and a pressure gauge 70 in a conventional manner to control and monitor the passage of treatment 38.

Figure 8:
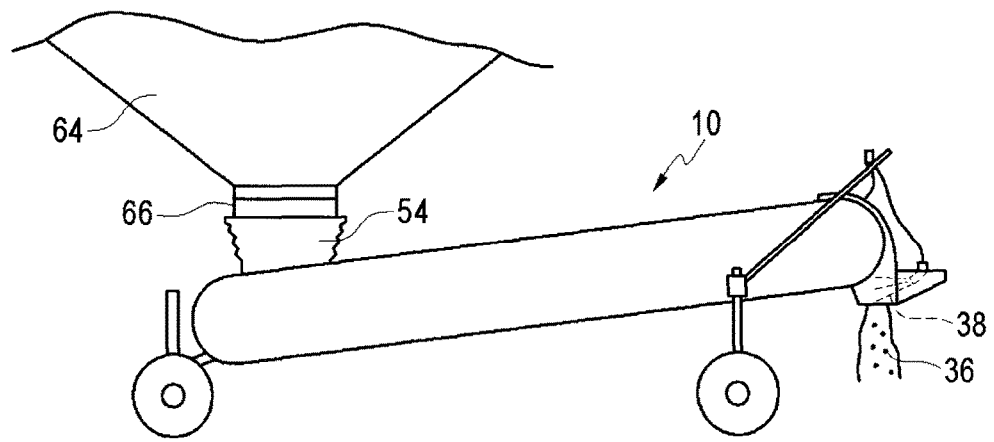
FIG. 8 is a side elevation view of the apparatus of Claim 1 positioned under a hopper-bottom bin.

As can be seen in FIG. 8, the treatment 38 is sprayed rearwardly within the seed treatment applicator 34 housing, as the seed 36 passes downwardly from the conveyor outlet 26 and past the nozzle 48 to the treated seed outlet 42. Although not shown, it is possible to incorporate a second nozzle on a rearward side of the seed treatment applicator 34 housing opposite to the nozzle 48, with spray toward the front of the apparatus 10, such that seed 36 is sprayed from front and back as it falls toward the treated seed outlet 42.

Figure 9:
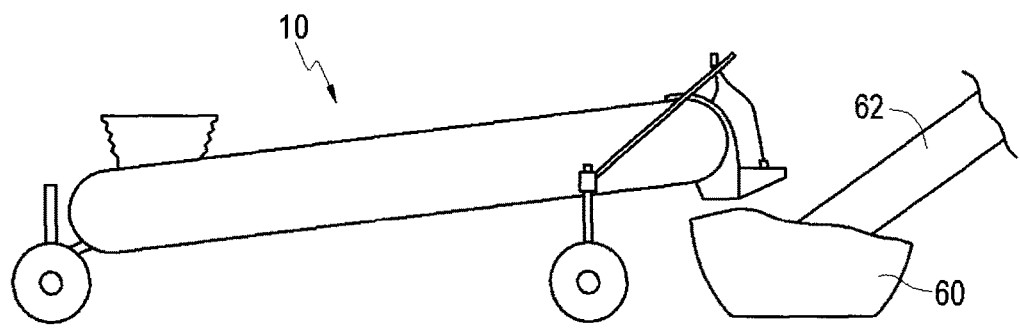
FIG. 9 is a side elevation view of the apparatus of Claim 1 with a mixing auger and boot.

FIGS. 8 and 9 illustrate the interface of the apparatus 10 with adjacent equipment. FIG. 8 illustrates the apparatus 10 receiving seed 36 from a bopper-bottom bin 64, where the collar 54 is upwardly extended to sealingly engage the bin outlet 66. As can be seen, this form of engagement has the advantage of keeping the intake 24 consistently full during operation of the apparatus 10 while reducing the chance of spillage or wind loss. FIG. 9 illustrates the positioning of an auger hopper 60 and mixing auger 62 at the discharge end of the apparatus 10. After the seed 36 has been sprayed with treatment 38, it falls through the treated seed outlet 42 into the hopper 60, where the seed 36 is then drawn up into the auger for mixing and more uniform coating of the seed 36 before being ultimately discharged into a truck or another storage unit. Although not shown, the auger hopper 60 could also be integrated with the front end of the apparatus 10 rather than be a separate piece of equipment, thereby further reducing exposure points.

The controller 50 is connected to both the conveyor motor 22 and the pump 46, and is used to control both the speed of the conveyor 16 and the rate of treatment 38 application, as will be discussed below. The controller 50 comprises a programmable logic controller, a data storage, a user interface and a display. The user interface and display are collectively a touchscreen 52, as seen in FIG. 2.

As has been indicated above, certain prior art seed treaters meter the seed to be treated but rely on volume alone to calculate treatment application rate, which does not take into account seed density, and the volume figure itself is subject in most cases to significant error. The apparatus 10 described above, while providing many advantages over prior art systems, is intended to address the error in volume determination in a low profile configuration. Methods according to the present invention, in contrast to prior art methods, use mass flow based on density and therefore are able to provide a more accurate determination that aligns with the standard application rates provided by most treatment manufacturers.

Standard application rates are normally provided in mL/100 kg, or volume/mass. Density is mass per unit volume, so if one knows the density for a particular seed to be treated, the mass can be determined based on that density and a measured seed volume, allowing the user to calculate an optimal application rate. The following two examples are illustrative of a method according to the present invention.

Example 1

Applying Raxil MD Liquid Seed Treatment to Wheat

A first test run was conducted using an apparatus in accordance with the present invention. The test apparatus had a single-revolution volume of 1.44 bushels, which figure was programmed into the controller to enable motor speed calculations.

Using a scale and a half-litre cup, the actual density of the seed was measured, rather than use a standard density which can be inaccurate. For example, in the instant example, the actual measured seed density was 67.8 lbs/bushel rather than the standard of 60 lbs/bushel. The application rate of Raxil MD is 300 mL/100 kg of seed.

For every revolution of the conveyor, the unit displaced 1.44 bushels/revolution×67.8 lbs/bushel=97.6 lbs/revolution or 44.3 kg/revolution. As Raxil MD was to be applied at 300 mL/100 kg of seed, the apparatus pump had to apply 44.3 kg/revolution×300 mL/100 kg=132 mL/revolution. The desired treating speed was 20 bushels of seed per minute, so the conveyor was operating at (20 bushels/minute)/(1.44 bushels/revolution)=13.9 rpm. Therefore, to achieve the desired application rate of Raxil MD Seed Treatment, the pump was operated at 132 mL/revolution×13.9 rpm=1845 mL/minute.

Example 2

Applying Raxil WW Liquid Seed Treatment to Barley

A second test run was conducted using an apparatus in accordance with the present invention. Using a scale and a half-litre cup, the actual density of the seed was measured, rather than use a standard density which can be inaccurate. For example, in the instant example, the actual measured seed density was 55.4 lbs/bushel rather than the standard of 48 lbs/bushel. The application rate of Raxil WW is 363 mL/100 kg of seed.

For every revolution of the conveyor, the unit displaced 1.44 bushels/revolution×55.4 lbs/bushel=79.8 lbs/revolution or 36.2 kg/revolution. As Raxil WW was to be applied at 363 mL/100 kg of seed, the apparatus pump had to apply 36.2 kg/revolution×363 mL/100 kg=131.3 mL/revolution. The desired treating speed was 18 bushels of seed per minute, so the conveyor was operating at (18 bushels/minute)/(1.44 bushels/revolution)=12.5 rpm. Therefore, to achieve the desired application rate of Raxil WW Seed Treatment, the pump was operated at 131.3 mL/revolution×12.5 rpm=1642 mL/minute.

Figure 10:
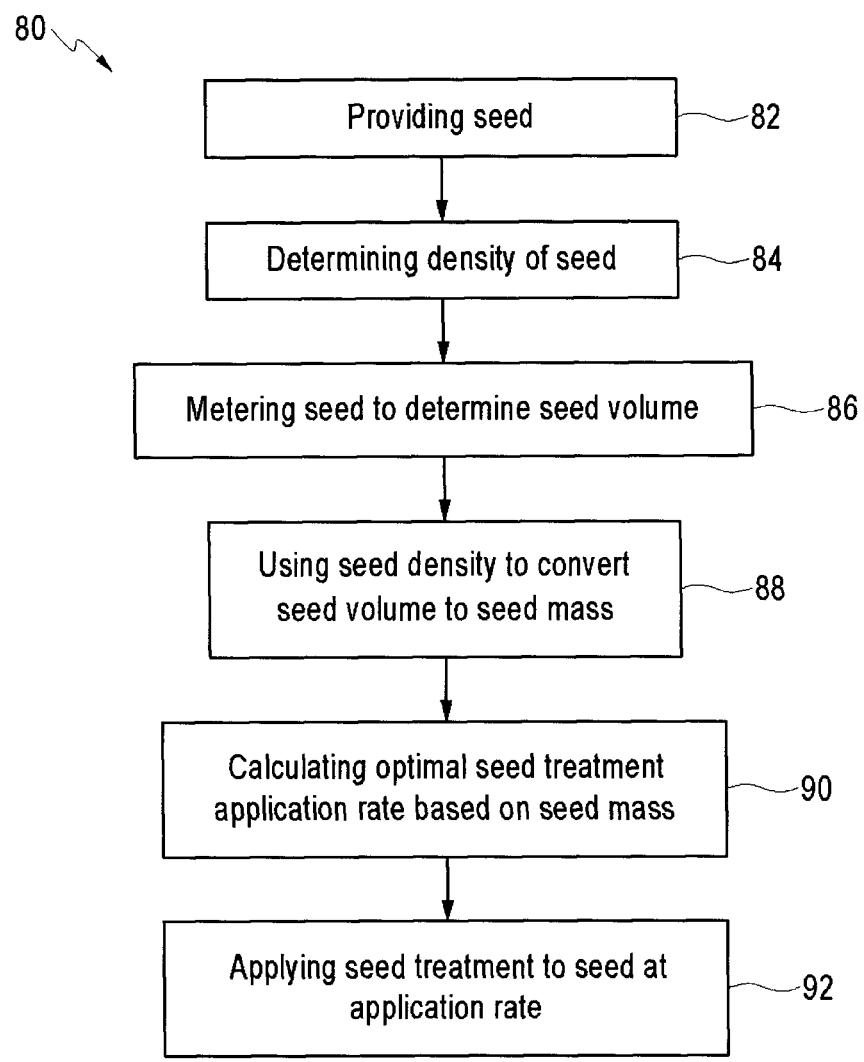
FIG. 10 is a flowchart illustrating a first method according to the present invention.
Figure 11:
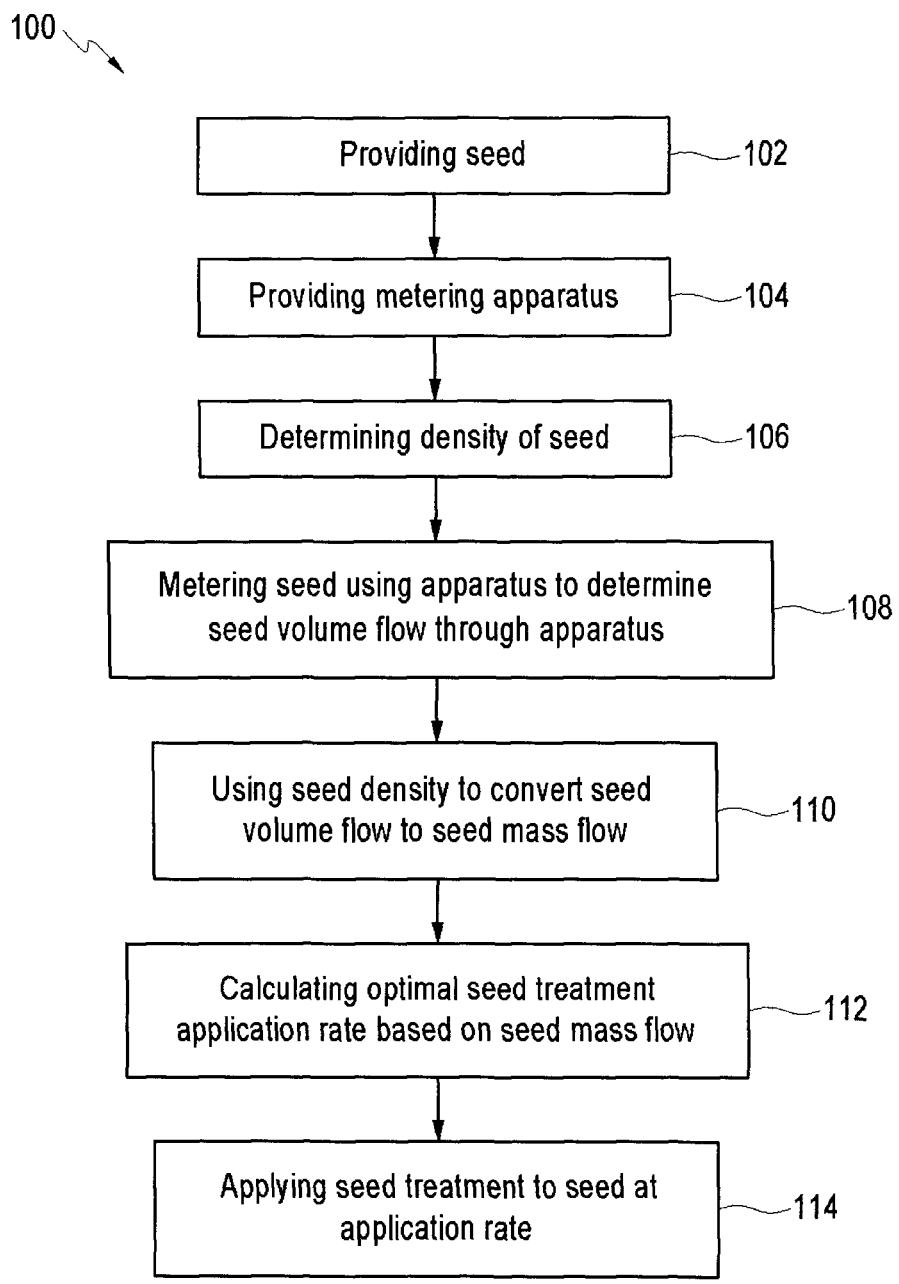
FIG. 11 is a flowchart illustrating a second method according to the present invention.

Turning now to FIGS. 10 and 11, methods according to the present invention are illustrated. In the method 80 illustrated in FIG. 10, seed is provided at step 82, followed by a determination of seed density at step 84. The seed is then metered at step 86 to determine the seed volume, and the seed density is used at step 88 to convert that seed volume value to a seed mass value. The seed mass value is then used at step 90 to calculate an optimal seed treatment application rate, followed by actual application of treatment at step 92.

In the method 100 illustrated in FIG. 11, seed is provided at step 102 and a metering apparatus such as apparatus 10 described above is provided at step 104. The seed density is determined at step 106. As indicated in the above examples, seed density can be determined using a simple scale-and-cup method; alternatively, where a conveyor-based metering apparatus is employed as in the present invention, the conveyor itself could be provided with a weighing mechanism such as a load cell to weigh the loaded conveyor and thereby determine seed density without recourse to a separate measurement step using a scale and cup. The seed is metered using the apparatus at step 108 (either concurrently with or subsequent to step 106) to determine a seed volume flow through the apparatus. This seed volume flow through the apparatus is then converted at step 110 to a seed mass flow through the apparatus using the seed density that was determined at step 106. The optimal seed treatment application rate is then calculated at step 112 based on the seed mass flow through the apparatus, followed by actual application of treatment at step 114.

Figure 7A:
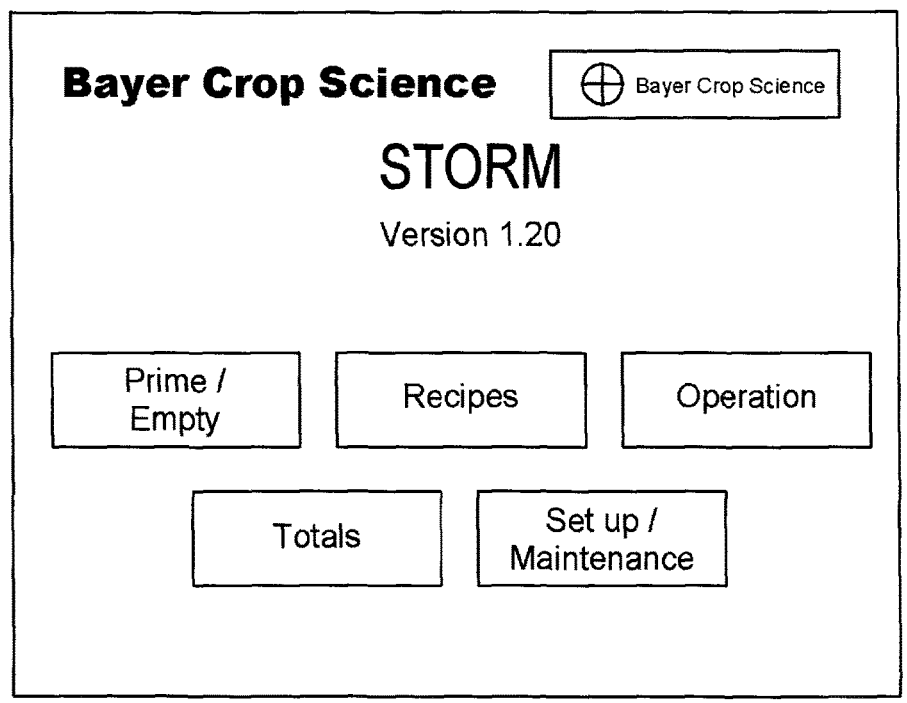

As indicated above, the apparatus 10 is provided with a controller 50 to enable operation of the apparatus 10 and implementation of the methods according to the present invention. Turning now to FIGS. 7a to 7g, screen shots are provided which illustrate the use of the controller 50 with touchscreen 52. When the controller 50 has been powered up, FIG. 7a is the first screen that is presented to the user. This main screen is facilitates operation of the controller 50.

Figure 7B:
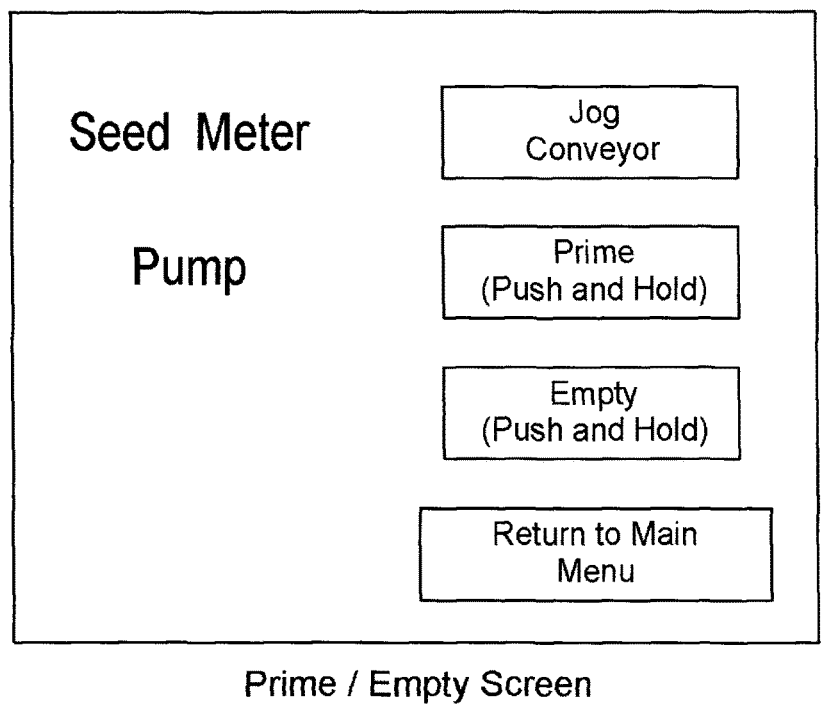

When the user presses the "Prime/Empty" button on the touchscreen, the Prime/Empty Screen is presented to the user, as shown in FIG. 7b. This screen is used to prepare the apparatus 10 for operation. The "Jog Conveyor" button is used once the bin seed supply has been initiated and the intake 24 has been flooded with seed 36; by pressing the button, the conveyor motor 22 is powered up so as to advance the conveyor 16 one cleat 28 at a time. The "Prime" button is used to pump treatment 38 from the treatment source 40 to the pump 46 and into the nozzle 48. The "Empty" button runs the pump 46 in reverse to return unused treatment 38 to the treatment source 40 at the completion of treatment.

Figure 7C:
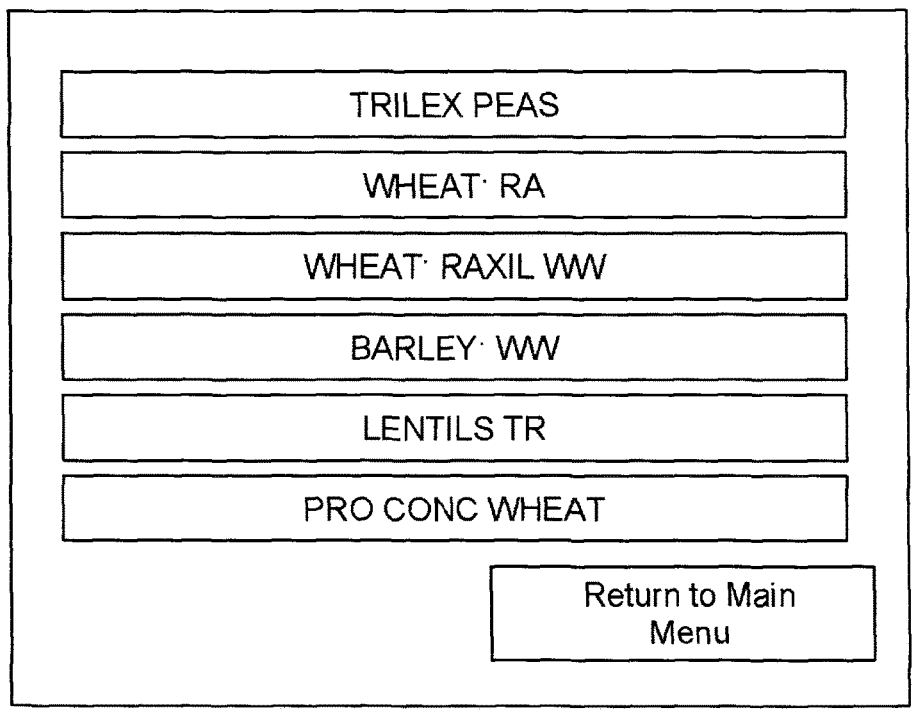

If the user selects the "Recipes" button the main screen, the user is presented with the Main Recipe Screen shown at FIG. 7c. This screen presents the user with a list of pre-programmed "recipes" or settings that are required for treatment application for different seed types. Pre-programming such settings allows the user to quickly return to needed settings.

When the user selects one of the recipes on the Main Recipe Screen, the user is presented with a Recipe Setting Screen for the particular seed type, an example of which is shown at FIG. 7d. This Recipe Setting Screen contains the information necessary for the proper control of the conveyor motor 22 and pump 46. The user can enter a recipe name (a keypad pops up upon selecting this item) and must enter a seed density, which seed density can be determined using a half-litre cup and scale as indicated above. As stated above, this seed density is used by the controller to convert the volume flow of the conveyor 16 to a mass flow. The application rate must also be entered by the user and is normally found on the treatment product label, expressed in mL/100 kg. The pump calibration number defaults to 1000 which is 100%, but this can be changed manually or through a pump test.

Figure 7E:
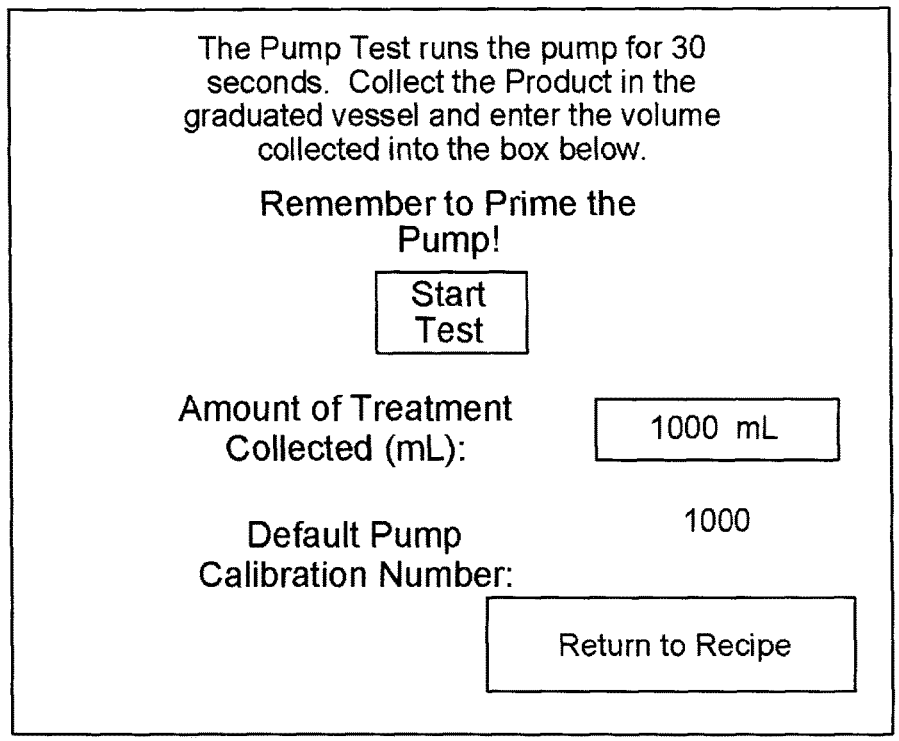

If the user presses the pump test button on the Recipe Setting Screen, they are presented with the Pump Calibration Screen shown at FIG. 7e. This screen is used to account for different seed treatment fluid viscosities, as fluids of different viscosities will move through the pump 46 differently. During the pump test, the pump 46 is operated for 30 seconds, the liquid is collected, and the volume is measured. The user enters the volume at the "Amount of Treatment Collected" line, and the controller calculates the volume pumped per revolution of the motor 22.

Returning to the Main Screen, the user can then select the "Operation" button and will be presented with the Operation Screen shown at FIG. 7f. This screen is displayed prior to and during operation of the apparatus 10. Once "Start" has been selected, the apparatus 10 will begin running and the "Start" button will disappear and be replaced on the touchscreen 52 with a red "Stop" button—pushing the "Stop" button will cause the motor 22 and pump 46 to shut off. Operation of the apparatus 10 will proceed on the basis of the selected seed-specific recipe and application rate (shown as bushels/minute and lbs/minute on the screen), both of which are displayed on the screen. The controller calculates how fast to turn the conveyor 16 based on the bushels required per minute, and uses the seed density to convert this volume to a mass flow through the apparatus 10. The mass flow is required as the application rate of treatment entered in the recipe is based on mL/10 kg. From this information, the controller then calculates how fast to turn the pump 46 to get the calculated optimal application rate of treatment. The controller uses proportional control to operate the pump 46 at the correct speed relative to the conveyor 16 speed; in this way the application rate is as desired regardless of the seed flow selected, and this control reduces the amount of calibration necessary when changing products and flow rates.

As can be further seen in FIG. 7f, the controller allows the user to select a certain batch size of seed 36 to be treated. By pressing the square to the right of the "Batch Size" label on the touchscreen 52, a further screen appears allowing the user to enter a seed amount in lbs. If a batch amount is entered, then the "lbs Treated" line is activated and tracks the amount of seed left to be treated in the batch. In this batch mode of operation, the unit will run until the set-point is reached and then the pump 46 and conveyor 16 will be shut off. If "0" is chosen as the batch size, the unit will run continuously until the "Stop" button is pressed on the touchscreen 52, and the "1 lbs Treated" line will display the seed that has been treated as the unit is running. The conveyor rpm and pump rpm are also displayed, and will display "0" until the unit is running.

From the Main Screen, the user can also select the "Totals" button, which will display a Totals Screen as shown in FIG. 7g. This screen tracks the treatment in progress, with options to track and save data for two batches and the treatment used. The screen also displays the lifetime treatment total of seed for the unit. From the Main Screen, the user can also select the "Setup/Maintenance" button, which can display a screen (not shown) for changing units from Imperial to Metric or any number of other settings.

As can be readily seen, then, the apparatus and method of the present invention present significant advantages over the prior art. For example, the apparatus provides for metering based on positive displacement instead of an inaccurate screw-type auger, with a low profile due to a horizontally disposed conveyor (both the belt-type conveyor and circular conveyor) so it can fit under common hopper-bottom bins. Also, the apparatus and methods according to the present invention incorporate a seed density determination to provide more accurate treatment application. Other advantages would be obvious to those skilled in the art.

The foregoing is considered as illustrative only of the principles of the invention. Thus, while certain aspects and embodiments of the invention have been described, these have been presented by way of example only and are not intended to limit the scope of the invention. Indeed, the invention described herein may be embodied in a variety of other forms without departing from the spirit of the invention, which invention is defined solely by the claims below.

The invention claimed is:
1. A seed treatment apparatus comprising:
a housing having an inner surface;
a conveyor generally horizontally disposed within the housing, the conveyor having spaced apart first and second ends and a conveyor drive mechanism;
a conveyor intake adjacent the first end for receiving seed;
a conveyor outlet adjacent the second end for discharging the seed;
a plurality of cleats each having opposed first and second edges, the cleats mounted at their first edges on an outward surface of the conveyor at regular spaced apart intervals, the second edges of the cleats extending toward the inner surface of the housing, such that the outward surface and the inner surface and the cleats collectively define a series of voids for receiving and transporting determinable volumes of the seed;
a scraper extending downwardly from the inner surface of the housing, the scraper having a length generally equal to a distance between the inner surface of the housing and the second edges of the cleats and a width equal to the cleats, such that when the cleats pass by the scraper the scraper levels off the received seed so that the received seed is flush with the second edges of the cleat so that a defined quantity of seed is conveyed in each of the voids, each defined quantity comprising a plurality of seeds;
a seed treatment applicator adjacent the conveyor outlet, the seed treatment applicator including an applicator housing for receiving the discharged seed, wherein liquid seed treatment is applied to the seed therein, wherein the seed treatment applicator comprises a peristaltic pump and at least one spray nozzle, the peristaltic pump being selectively adjustable so as to apply a predetermined quantity of the liquid seed treatment based on the defined quantities of seed; and a seed treatment source in fluid communication with the seed treatment applicator for providing the liquid seed treatment.

2. The apparatus of claim 1 wherein the housing defines the conveyor intake and the conveyor outlet.

3. The apparatus of claim 1 wherein the scraper is a brush.

4. The apparatus of claim 1 wherein the conveyor is a continuous belt conveyor.

5. The apparatus of claim 1 further comprising a controller for controlling the conveyor drive mechanism and the seed treatment applicator.

6. The apparatus of claim 5 wherein the controller comprises a programmable logic controller, a data storage, a user interface, and a display.

7. The apparatus of claim 6 wherein the user interface and the display are collectively a touchscreen monitor.

8. The apparatus of claim 1 further comprising a channeling collar mounted proximate the conveyor intake for directing the seed toward the conveyor intake.

9. The apparatus of claim 8 wherein the channeling collar is upwardly biased so as to sealingly engage with a source of the seed.

10. The apparatus of claim 1 further comprising an extensible support on the housing for selectively elevating the second end of the conveyor.

11. The apparatus of claim 1 further comprising at least one ground-engaging wheel to enable relocation of the apparatus.

\* \* \* \* \*